United States Patent
Gonze et al.

(10) Patent No.: US 8,051,644 B2
(45) Date of Patent: Nov. 8, 2011

(54) ELECTRICALLY HEATED PARTICULATE FILTER ZONE-BASED POST FUEL INJECTION SYSTEM

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 393 days.

(21) Appl. No.: 12/467,499

(22) Filed: May 18, 2009

(65) Prior Publication Data

US 2010/0205943 A1 Aug. 19, 2010

Related U.S. Application Data

(60) Provisional application No. 61/153,457, filed on Feb. 18, 2009.

(51) Int. Cl.
*F01N 3/00* (2006.01)

(52) U.S. Cl. .......... 60/286; 60/295; 60/303; 60/311

(58) Field of Classification Search ........... 60/286, 60/287, 297, 303, 311
See application file for complete search history.

(56) References Cited

U.S. PATENT DOCUMENTS

| | | | | | |
|---|---|---|---|---|---|
| 4,505,726 | A | * | 3/1985 | Takeuchi et al. | 55/282 |
| 4,516,993 | A | * | 5/1985 | Takeuchi et al. | 55/283 |
| 4,641,496 | A | * | 2/1987 | Wade | 60/374 |
| 4,875,335 | A | * | 10/1989 | Arai et al. | 60/274 |
| 4,881,959 | A | * | 11/1989 | Kono et al. | 55/282.3 |
| 4,897,096 | A | * | 1/1990 | Pischinger et al. | 55/283 |
| 7,594,940 | B2 | * | 9/2009 | Gonze et al. | 55/283 |
| 7,655,065 | B2 | * | 2/2010 | Gonze et al. | 55/523 |
| 7,686,857 | B2 | * | 3/2010 | Gonze et al. | 55/282.3 |
| 7,886,529 | B2 | * | 2/2011 | Gonze et al. | 60/295 |
| 2004/0088955 | A1 | * | 5/2004 | Garner et al. | 55/282.3 |
| 2006/0272319 | A1 | * | 12/2006 | Dettling et al. | 60/295 |
| 2007/0220870 | A1 | * | 9/2007 | Gonze et al. | 60/297 |
| 2007/0227104 | A1 | * | 10/2007 | Gonze et al. | 55/282.3 |
| 2009/0183501 | A1 | * | 7/2009 | Gonze et al. | 60/303 |
| 2010/0186384 | A1 | * | 7/2010 | Gonze et al. | 60/286 |
| 2011/0005205 | A1 | * | 1/2011 | Lee et al. | 60/277 |

* cited by examiner

*Primary Examiner* — Thomas Denion
*Assistant Examiner* — Patrick Maines

(57) ABSTRACT

A system includes a particulate matter (PM) filter with multiple zones. An electrical heater includes heater segments that are associated with respective ones of the zones. The electrical heater is arranged upstream from and proximate with the PM filter. A post fuel injection system injects fuel into at least one of a cylinder of an engine and an exhaust system. A control module selects one of the zones, adjusts post fuel injection based on the selected one of the zones, and electrically heats the one of the zones via a respective one of the heater segments.

20 Claims, 11 Drawing Sheets

ELECTRICALLY HEATED PARTICULATE FILTER ZONE-BASED POST FUEL INJECTION SYSTEM

CROSS-REFERENCE TO RELATED APPLICATIONS

This application claims the benefit of U.S. Provisional Application No. 61/153,457, filed on Feb. 18, 2009. The disclosure of the above application is incorporated herein by reference.

FIELD

The present disclosure relates to engine control systems for internal combustion engines, and more particularly to particulate filter regeneration systems.

BACKGROUND

The statements in this section merely provide background information related to the present disclosure and may not constitute prior art.

Engines such as diesel engines produce particulate matter (PM) that is filtered from exhaust gas by a PM filter, such as a wall-flow PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Regeneration may be performed using an exhaust heating technique or using an electrical heating technique. An exhaust heating technique refers to the heating of an exhaust gas, for example, by post injection of fuel. During a combustion cycle of an engine, an air/fuel mixture is compressed and ignited within a cylinder of the engine. For robustness and to facilitate regeneration, fuel may be injected into the cylinder during the combustion cycle and after ignition of the air/fuel mixture or into the exhaust stream. The fuel may in addition to or alternatively be injected into the exhaust stream or exhaust system. When introduced during or after ignition and/or exhaust strokes of the combustion cycle, the injected fuel, referred to as post-injected (PI) fuel, mixes with the exhaust gas and is oxidized by an oxidation catalyst disposed in the exhaust system. The heat released from the oxidation reaction in the catalyst increases the temperature of the exhaust system, which facilitates the ignition of the particulates in the PM filter.

The electrical heating technique refers to the electrical heating of an exhaust gas entering a PM filter. One or more electrical coils may be disposed upstream from the PM filter and may be activated to heat the exhaust gas. This provides a quick heating and light off of the PM.

PM reduction systems that use fuel tend to decrease fuel economy. For example, many fuel-based PM reduction systems decrease fuel economy by 5%. To improve fuel economy, electrically heated PM reduction systems are used. When electrically heated PM reduction systems are used in combination with fuel-based PM reduction systems, expansion and compression forces can occur within the PM filter. The expansion and compression forces are due to temperature differentials between, for example, an electrically heated zone(s) and a non-electrically heated area(s) of the PM filter. The expansion and compression forces cause stress on the PM filter, which can result in fractures, for example, in the corderite substrate of the PM filter.

SUMMARY

In one embodiment, a system is provided that includes a particulate matter (PM) filter with multiple zones. An electrical heater includes heater segments that are associated with respective ones of the zones. The electrical heater is arranged upstream from and proximate with the PM filter. A post fuel injection system injects fuel into at least one of a cylinder of an engine and an exhaust system. A control module selects one of the zones, adjusts post fuel injection based on the selected one of the zones, and electrically heats the one of the zones via a respective one of the heater segments.

In other features, a method is provided that includes providing a PM filter with multiple zones. An electrical heater with heater segments that are associated with respective ones of the zones is arranged upstream from and proximate with the PM filter. Fuel is injected into at least one of a cylinder of an engine and an exhaust system via a post fuel injection system. One of the zones is selected for regeneration. Post fuel injection is adjusted based on the selected one of the zones. The one of the zones is electrically heated via a respective one of the heater segments.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
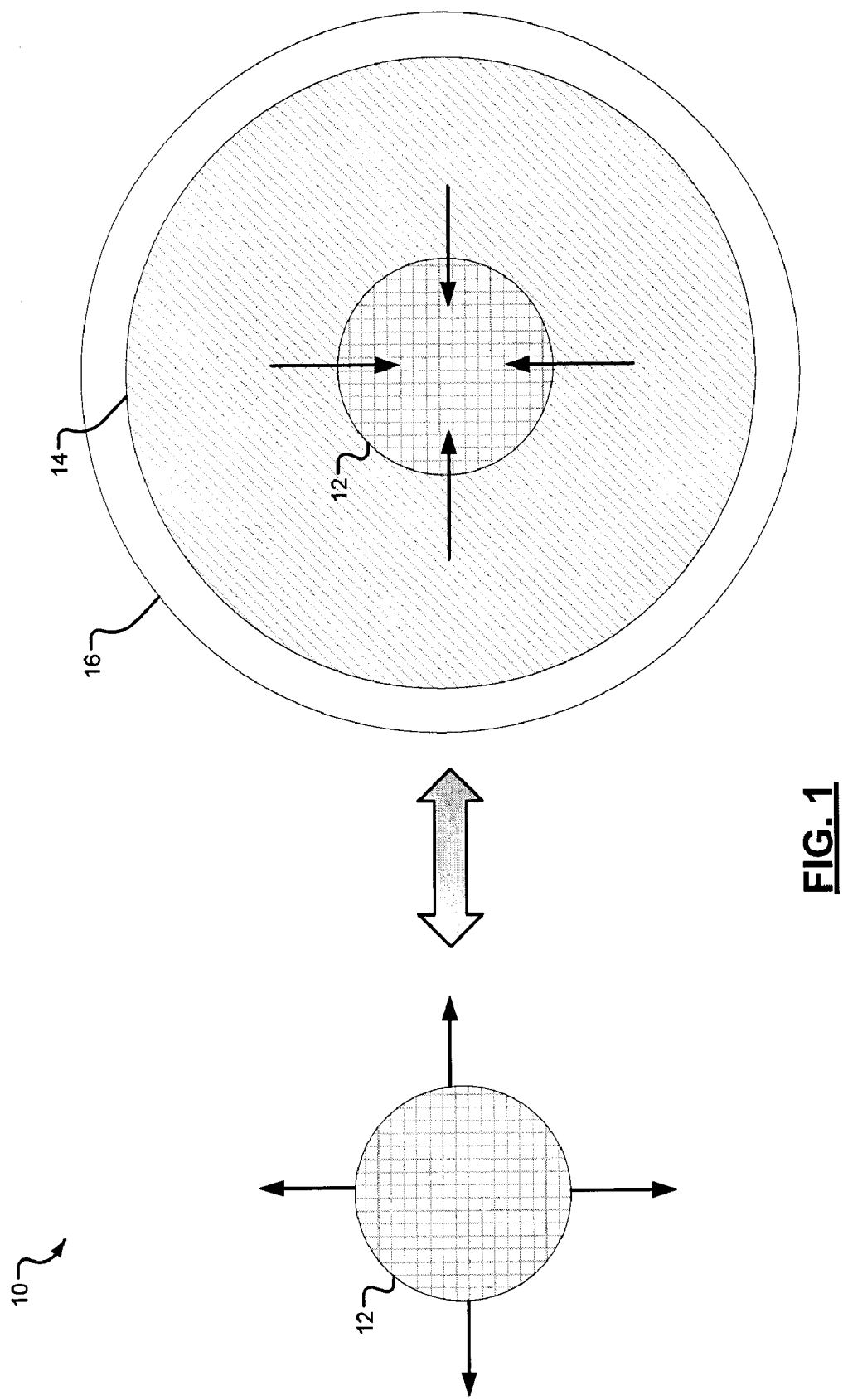
FIG. 1 is a thermal expansion diagram illustrating stress forces during regeneration.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to example internal combustion engines, the embodiments of the present disclosure may apply to other engines. For example, the present invention may apply to compression ignition, spark ignition, spark ignition direct injection, homogenous spark ignition, homogeneous charge compression ignition, stratified spark ignition, diesel, and spark assisted compression ignition engines.

In addition, in the following description terms, such as "first", "second", and "third" are used. These terms are not specific to any one device or element. More than one of the terms may be used to refer to the same device depending upon the context. For example, the terms first and second may be used to refer to the same module.

Furthermore, various sensors and parameters are disclosed herein. The parameters may be directly determined based on signals from the corresponding sensors or may be indirectly determined. When indirectly determined, the parameters may be based on signals from non-corresponding sensors, based on determined engine and/or exhaust system operating conditions, and/or based on predetermined values. For example, air flow across an external area of an exhaust system may be directly determined via an air flow sensor or may be estimated based on information from a vehicle speed sensor and/or other sensors.

The use of an electrically heated particulate matter filter (PF) is an efficient technique for regenerating a PF. An electrically heated PF may be used to divide regeneration of a PF into zones, which permits fast regeneration using soot as fuel without damaging the PF. An electrically heated PF may be regenerated in less than 5 minutes, compared to 20-30 minutes for exhaust heated regeneration techniques, such as post fuel injection techniques. As exhaust flow rates increase, the facilitation and ability to initiate regeneration by an electrically heated element decreases. Thus, for example, when an exhaust flow rate is within a predetermined range, both post fuel injection and electrical heating may be used to initiate and/or facilitate regeneration.

Referring now to FIG. 1, a thermal expansion diagram is shown. The thermal expansion diagram illustrates expansion and compression forces experienced by a dual-zoned PM filter 10 during post fuel injection with an electrically heated zone. Although a dual-zoned PM filter is shown, any number of zones may be included. The thermal expansion diagram is provided as an example only, other expansion and compression forces may be experienced depending upon the zone configuration (number and arrangement of zones) of a PM filter, the zone(s) that are electrically heated, exhaust gas temperatures, zone temperatures, etc.

As a particular zone of a PM filter is heated, that zone expands putting outward pressure on PM filter elements that are external to the heated zone and that are not electrically heated and/or cooler than the heated zone. The PM filter elements may include portions of a PM filter substrate, portions of an outer housing or shell of the PM filter, and elements between the PM filter substrate and the shell, such as insulating elements. The non-electrically heated elements may, for example, be at an exhaust temperature, which is less than the electrically heated elements. For example only, during post fuel injection, the exhaust temperature may be at approximately 450° C., whereas the electrically heated zone may be at approximately 850° C. This 400° C. temperature differential causes expansion and compression forces between the electrically heated and non-electrically heated elements of the PM filter.

In the example of FIG. 1, a cross-sectional area of the PM filter 10 is shown divided into two zones, an inner circular zone 12 and an outer ring-shaped zone 14. The cross-sectional area or cross-section of a PM filter, as described herein, refer to an area perpendicular to a longitudinal axis of the PM filter that extends between an input and an output of the PM filter. The cross-sectional area or cross-section extends radially outward from the longitudinal axis. In use, the inner circular zone 12 is located within the outer ring-shaped zone 14.

The inner circular zone 12 exerts expansion forces when electrically heated on the outer ring-shaped zone 14. The outer ring-shaped zone 14, being at the temperature of the exhaust gas (e.g. 300° C.), exerts compression forces on the inner circular zone 12, which is at a higher temperature (e.g. 850° C.). The outer ring-shaped zone 14 is relatively cool compared to the inner circular zone 12. As such, the outer ring-shaped zone 14 restricts expansion of the inner circular zone 12 through compression.

Expansion and compression (stress) forces can increase as the heated zone of a PM filter increases in size relative to the cross-sectional area of the PM filter or the closer the heated zone is located relative to the perimeter of the PM filter. This increase in stress forces can result in fractures in the substrate of the PM filter. The closer the heated zone is to the perimeter of the PM filter, the less expansion forces can be absorbed by the material between the heated zone and the shell of the PM filter. For example, when the out ring-shaped zone 14 is electrically heated, the outer ring-shaped zone 14 exerts outward force on the shell or outer housing 16 of the PM filter 10. Since the outer housing 16 is a rigid structure, the outer housing 16 provides minimal expansion and as such absorbs a minimal amount of the expansion forces.

Thermal expansion force F may be represented as shown by expression 1, where α is a coefficient of expansion, ΔT is the temperature differential, E is Young's Modulus, and P is perimeter length of a cross-section of the PM filter of the heated zone.

$$F = \alpha \Delta T E P \qquad (1)$$

As the amount of material for a given volume increases, the expansion force F increases. The change in volume may be, for example, related to a change in cross-sectional area, size, diameter, length and/or perimeter of the material.

The embodiments described below adjust post fuel injection operation based on zone(s) of a PM filter that are electrically heated to maintain stress due to the expansion and compression forces below a predetermined level (e.g. 4.0 mega-pascals (MPa)).

Figure 2:
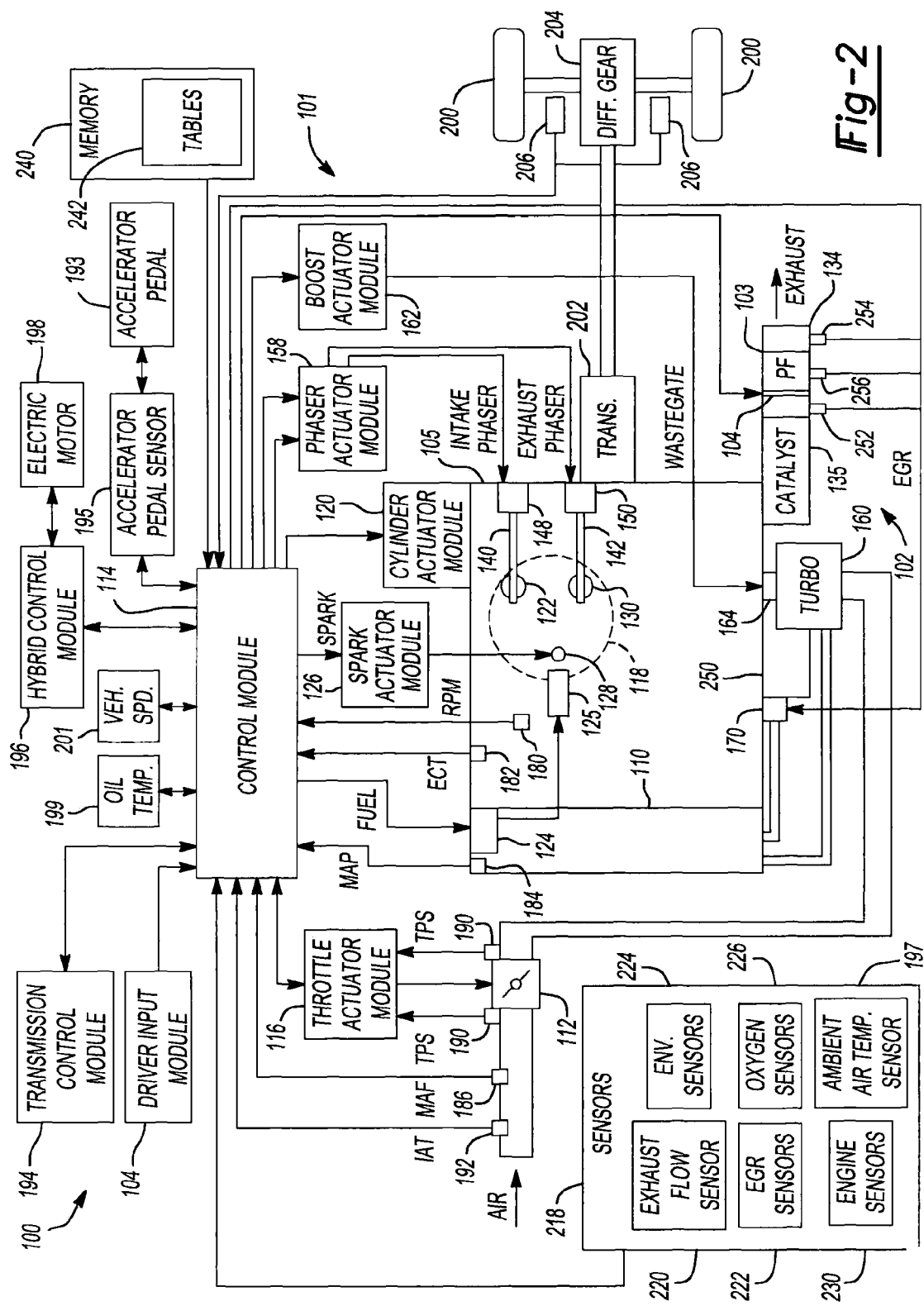
FIG. 2 is a functional block diagram of an engine system in accordance with an embodiment of the present disclosure.

Referring now to FIG. 2, an engine system 100 that incorporates a regeneration system 101 that performs both post fuel injection and electrically heated PF regeneration is shown. Although the following embodiment is directed to a hybrid vehicle, the embodiments disclosed herein may be applied to non-hybrid vehicles. The engine system includes an exhaust system 102, which includes the regeneration system 101. The regeneration system 101 is used to remove particulates in a PF 103 of the exhaust system 102. The regeneration system regenerates the PF 103 by performing post fuel injection and/or by electrically heating exhaust and/or an upstream portion of the PF 103. A heater assembly 104 is located upstream of the PF 103 and may be activated to initiate regeneration.

The engine system 100 includes an engine 105 that combusts an air/fuel mixture to produce drive torque for a vehicle based on a driver input module 104. Air is drawn into an intake manifold 110 through a throttle valve 112. A control module 114, which may be referred to as an engine control module, commands a throttle actuator module 116 to regulate opening of the throttle valve 112 to control the amount of air drawn into the intake manifold 110. The engine system 10 and/or the control module 114 may include one or more of the modules of FIG. 2.

Air from the intake manifold 110 is drawn into the cylinder 118 through an intake valve 122. The control module 114 controls the amount, timing, and number of fuel injections into each cylinder of the engine 105 and during a combustion cycle via a fuel injection system 124 that includes one or more fuel injectors 125. A combustion cycle may refer to an intake stroke, a compression stroke, an ignition stroke and an exhaust stroke of a cylinder. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders, as shown.

The fuel that is injected prior to an ignition stroke with the air and creates the air/fuel mixture in the cylinder 118. A piston (not shown) within the cylinder 118 compresses the air/fuel mixture. Based upon a signal from the control module 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed. The fuel (post-injected fuel) that is injected during or after an ignition stroke mixes with, for example, exhaust gas in the respective cylinder and is released into the exhaust system 134.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. Exhaust passes through an oxidation catalyst 135 and the PF 103. The embodiments disclosed herein may be applied to an aftertreatment system that includes an oxidation catalyst, a particulate filter, and/or other catalyst and aftertreatment components.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

A control module 114 may regulate the position of the intake valve 122 and/or the exhaust valve 130 to increase the quantity of fuel ingested into the cylinder(s) 118. The control module 114 may also adjust operation of the fuel injector(s) 125, such as ON time or size of injector openings, to increase the amount of fuel injected into the cylinder(s) 118. The control module 114 may also adjust the timing of the exhaust camshaft(s) corresponding to the change in the A/F mixture.

The time at which the intake valve 122 is opened may be varied with respect to piston TDC by an intake cam phasor 148. The time at which the exhaust valve 130 is opened may be varied with respect to piston TDC by an exhaust cam phasor 150. A phasor actuator module 158 controls the intake cam phasor 148 and the exhaust cam phasor 150 based on signals from the control module 114.

The control system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The control module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 105 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. The MAF sensor 186 may be located in a housing that includes the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The control module 114 may use signals from the sensors to make control decisions for the engine system 100.

The control module 114 may communicate with a transmission control module 194 to coordinate shifting gears in a transmission (not shown). For example, the control module 114 may reduce torque during a gear shift. The control module 114 may communicate with a hybrid control module 196 to coordinate operation of the engine 105 and an electric motor 198. The electric motor 198 may also function as a generator, and may be used to produce electrical energy for use by vehicle electrical systems and/or for storage in a battery. In various implementations, the control module 114, the transmission control module 194, and the hybrid control module 196 may be integrated into one or more modules.

The combined torque of engine 105 and electric motor 198 is applied to an input of transmission 202. Transmission 202 may be an automatic transmission that switches gears in accordance with a gear change command from the control module 114. An output shaft of transmission 202 is coupled to an input of a differential gear 204. Differential gear 204 drives axles and wheels 200. Wheel speed sensors 206 generate signals that indicate a rotation speed of their respective wheels 200.

The control module 114 estimates an engine output torque to provide based on received sensor signals and other parameters described herein. The control module 114 may adjust a position of the throttle, air-fuel ratio, valve timing, fuel injection, etc. to provide the estimated engine output torque. Based on a desired engine output torque, a desired air flow, a desired fuel injection, and/or a desired spark timing is achieved. The desired engine output torque may be based on a vehicle operator (driver) request and/or may be controller based, such as a torque output request from a cruise control system. In particular, the control module 114 controls the torque output of the engine based on the coordinated torque control methods and systems of the present disclosure.

The sensor signals that are received by the control module 114 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 199, and a vehicle speed sensor 201.

The control module 114 communicates with the throttle actuator module 116. The control module 114 receives a throttle position signal from the throttle position sensor 190 and adjusts throttle position based on the throttle position signal. The control module 114 may control the throttle 112 using a throttle actuator based on a position of an accelerator pedal 193.

Air mass, volume, and pressure per cylinder may be determined and/or estimated based on signals from the sensors 184, 186. The control module 114 may adjust engine and exhaust system devices based on a desired MAP and a desired MAF. The desired MAP and MAF may be determined based on engine speed and torque request signals.

The engine system 100 may further include other sensors 218, such as exhaust flow sensors 220, an EGR sensor 222, environmental sensors 224, an oxygen sensor 226 and engine sensors 230 not mentioned above. The environmental sensors 224 may include an altitude sensor, the ambient temperature sensor 197, a barometric pressure sensor, and an air flow sensor, as shown in FIG. 2. The environmental sensors 224 may be used to determine environmental conditions, which may be further used to adjust post injection of fuel and/or to determine a desired throttle area. The desired throttle area may correspond to a specific throttle position.

The engine system 100 may also include memory 240, which may be used when performing post injection of fuel and/or when performing various functions associated with the modules of the control module 114. Example modules of the control module 114 are shown and described with respect to the embodiment of FIG. 2. The memory 240 may include various tables 242, which may include predetermined exhaust temperature values, predetermined environmental condition values, correction factors, coefficient values, etc. for post injection of fuel control. The contents of the memory 240 may be associated with one or more of the steps described with respect to the embodiment of FIG. 3.

The exhaust system 134 includes an exhaust manifold 250, the oxidation catalyst 135, and the PF 103. Optionally, an EGR valve (not shown) re-circulates a portion of the exhaust back into the intake manifold 110. The remainder of the exhaust is directed into the turbocharger 160 to drive a turbine. The turbine facilitates the compression of the fresh intake air. Exhaust flows from the turbocharger 160 through the oxidation catalyst 135 and into the PF 103. The oxidation catalyst 135 oxidizes the exhaust based on a post combustion air/fuel ratio. The amount of oxidation increases the temperature of the exhaust. The PF 103 receives exhaust from the oxidation catalyst 135 and filters any soot particulates present in the exhaust. The post injection of fuel is used to heat the soot to a regeneration temperature.

A control module 114 controls the engine and regeneration of the PF 103 based on various sensed information and soot loading. More specifically, the control module 114 estimates loading of the PF 103. When the estimated loading is at a predetermined level and/or the exhaust flow rate is within a desired range, regeneration may be enabled. The duration of the regeneration process may be varied based upon the estimated amount of particulate matter within the PF 103. Post injection of fuel may be adjusted throughout the regeneration process.

The post-injected (PI) fuel and/or post-combustion air/fuel mixture is passed to and may be oxidized by the oxidation catalyst 135, which heats the PF 103. The oxidation catalyst 135 promotes oxidation of unburned fuel and raises the temperature of the exhaust gas using heat generated by an oxidation reaction. The heat may cause soot in the PF 103 to reach a point of ignition (light-off) and thus start regeneration. The ignition of the soot creates an exotherm that propagates along the PF 103 and heats soot downstream, continuing the regeneration process. During regeneration, the soot may be ignited using post injection and/or by electrically heating elements of the heater assembly 104.

The engine system 100 may include exhaust system sensors, such as the exhaust flow sensors 220, exhaust pressure sensors 252, 254, an exhaust temperature sensor 256, etc. for determining exhaust flow levels, exhaust temperature levels, exhaust pressure levels, etc.

The PF 103 may have an associated predetermined regeneration temperature operating range, a predetermined regeneration operating temperature, and/or a predetermined peak operating temperature. The peak operating temperature may be associated with a point of potential degradation. For example, a PF may begin to breakdown at operating temperatures greater than 800° C. The peak operating temperature may vary for different PFs. The peak operating temperature may be associated with an average temperature of a portion of a PF or an average temperature of the PF as a whole.

To prevent damage to the PF 103, to improve fuel economy, and to provide an efficient regeneration process, post fuel injection may be adjusted based on the zone(s) of the PM filter being activated. Post fuel injection may be provided at a first level for inner most zone(s) of the PM filter. Post fuel injection may be increased to levels greater than the first level for zone(s) closer to a cross-sectional perimeter of the PM filter that are activated. Examples are described with respect to the embodiments of FIGS. 4 and 10. The order in which zones are activated may vary. Zone(s) closer to the perimeter may be activated before zone(s) more centrally located and vice versa.

Also, to prevent damage to a PM filter, and increase the operating life of the PM filter, the embodiments of the present disclosure may adjust PM filter regeneration based on soot loading. A target maximum operating temperature is set for a PM filter. Regeneration is performed when soot loading is less than or equal to a soot loading level associated with the maximum operating temperature. The regeneration may be performed when soot loading levels are low or within a predetermined range. The predetermined range has an upper soot loading threshold $S_{ut}$ that is associated with the maximum operating temperature. Limiting peak operating temperatures of a PM filter minimizes pressures in and expansion of the PM filter. In one embodiment, soot loading is estimated and regeneration is performed based thereon. In another embodiment, when soot loading is greater than desired for regeneration, mitigation strategies are performed to reduce PM filter peak temperatures during regeneration.

Soot loading may be estimated and/or predicted from parameters, such as mileage, exhaust pressure, exhaust drop off pressure across a PM filter, etc. Mileage refers to vehicle mileage, which can be used to estimate vehicle engine operating time and/or the amount of exhaust gas generated. For example only, regeneration may be performed when a vehicle has traveled approximately 200-300 miles. The amount of soot generated typically depends upon the amount of vehicle loading and use over time. At idle speeds, less soot is generated than when operating at higher speeds. The amount of exhaust gas generated is related to the state of soot loading in the PM filter.

Exhaust pressure can be used to estimate the amount of exhaust generated over a period of time. Regeneration may be performed when an exhaust pressure exceeds a predetermined level. For example when exhaust pressure entering a PM filter exceeds a predetermined level, regeneration may be performed. As another example when exhaust pressure exiting a PM filter is below a predetermined level, regeneration may be performed.

Exhaust drop off pressure may be used to estimate the amount of soot in a PM filter. For example, as the drop off pressure increases the amount of soot loading increases. The exhaust drop off pressure may be determined by determining pressure of exhaust entering a PM filter minus pressure of exhaust exiting the PM filter. Exhaust system pressure sensors may be used to provide these pressures.

A predictive method may include the determination of one or more engine operating conditions, such as engine load, fueling schemes, fuel injection timing, and exhaust gas recirculation (EGR). A cumulative weighting factor may be used based on the engine conditions. The cumulative weighting factor is related to soot loading. When the cumulative weighting factor exceeds a threshold, regeneration may be performed.

Based on the estimated soot loading and a predetermined peak operating temperature for a PM filter, regeneration is performed to prevent the PM filter from operating at temperatures above the peak operating temperature.

Designing a control system to target a selected soot loading allows PM filter regenerations without intrusive controls. A robust regeneration strategy as provided herein, removes soot from a PM filter while limiting peak operating temperatures. Limiting of peak operating temperatures reduces thermal stresses on a substrate of a PM filter and thus prevents damage to the PM filter, which can be caused by high soot exotherms. As a result, durability of the PM filter is increased.

When soot loading is greater than a threshold level associated with a set peak regeneration temperature, mitigation strategies may be performed to reduce PM filter peak temperatures during regeneration. For example, when a maximum soot loading threshold is set at approximately 2 g/l and current soot loading is 4 g/l, to minimize temperatures within a PM filter during regeneration, engine operation is adjusted. The adjustment may include oxygen control and exhaust flow control.

Soot loading may be greater than an upper threshold level, for example, when an engine is operated to receive a high intake air flow rate for an extended period of time. Such operation may occur on a long freeway entrance ramp or during acceleration on a freeway. As another example, a soot loading upper threshold may be exceeded when a throttle valve of an engine is continuously actuated between full ON and full OFF for an extended period of time. High air flow rates can prevent or limit regeneration of a PM filter.

During oxygen control, the amount of oxygen entering the PM filter is decreased to decrease the exotherm temperatures of the PM filter during regeneration. To decrease oxygen levels airflow may be decreased, EGR may be increased, and/or fuel injection may be increased. The fuel injection may be increased within engine cylinders and/or into the associated exhaust system. The burning of more fuel decreases the amount of oxygen present in the exhaust system.

A large increase in exhaust flow can aid in distinguishing or minimizing an exothermic reaction in a PM filter. Exhaust flow control may include an increase in exhaust flow by a downshift in a transmission or by an increase in idle speed. The increase in engine speed increases the amount of exhaust flow.

Figure 3:
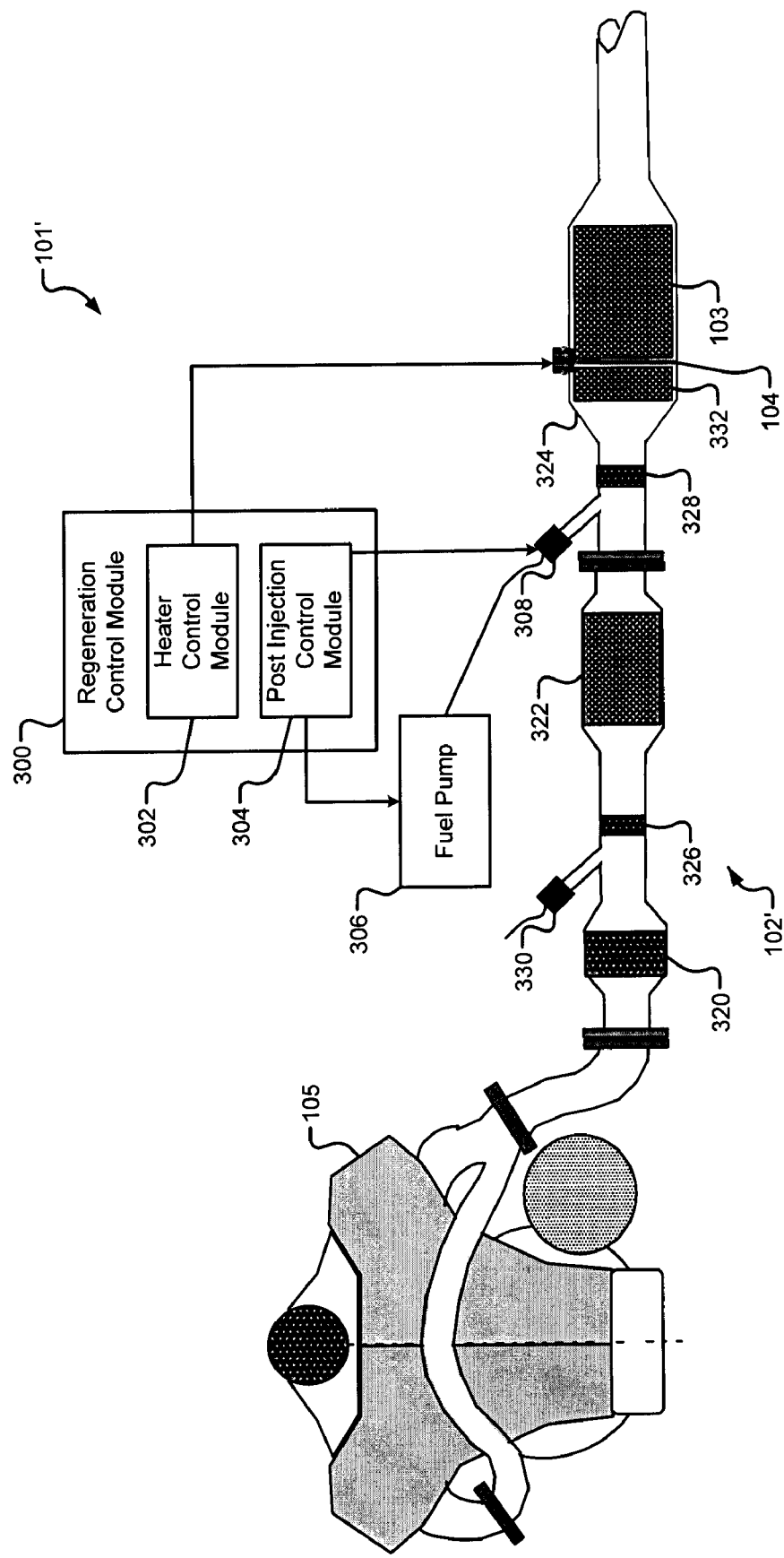
FIG. 3 is a functional diagram of a regeneration system in accordance with an embodiment of the present disclosure.

Referring now to FIG. 3, a regeneration system 101' and corresponding exhaust system 102' of the engine 105 is shown. The regeneration system 101' includes a regeneration control module 300, which may be part of the control module 114 of FIG. 2. The regeneration control module 300 includes a heater control module 302 and a post injection control module 304. The heater control module 302 controls operation of the heater assembly 104. The post injection control module 304 may control operation of a fuel pump 306 and/or a fuel injector 308 for direct injection of fuel into the exhaust system 102'. The post injection control module 304 may also or alternatively control the post injection of fuel into cylinders of the engine 105.

The exhaust system 102' includes a first DOC 320, a selective catalytic reduction (SCR) device 322 and a PF assembly 324. The SCR device 322 is located downstream from the first DOC 320. The PF assembly 324 is located downstream from the SCR device 322. A first set of mixers 326 may be located between the first DOC 320 and the SCR device 322. A second set of mixers 328 may be located between the SCR device 322 and the PF assembly 324.

The exhaust system 102' may include a urea system that includes a urea injector 330. The urea injector 330 may inject urea directly into the exhaust system 102, for example, between the first DOC 320 and the first set of mixers 326, as shown. The exhaust system 102' may also include a fuel injector 308 for post fuel injection. The fuel injector 308 may inject fuel directly into the exhaust system 102', such as between the SCR device 322 and the second set of mixers 328, as shown.

The PF assembly 324 may include a second DOC 332, the heater assembly 104 and the PF 103. The heater assembly 104 is located downstream from the second DOC 332. The PF 103 is located downstream from the heater assembly 104.

Figure 5:
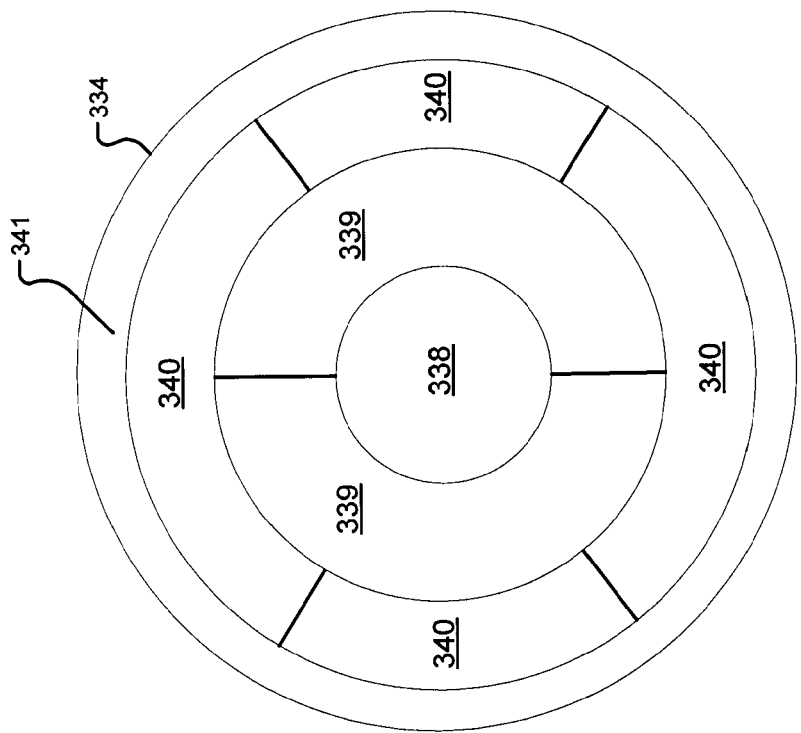
FIG. 5 is a cross-sectional view of a five-zoned PM filter in accordance with an embodiment of the present disclosure.
Figure 4:
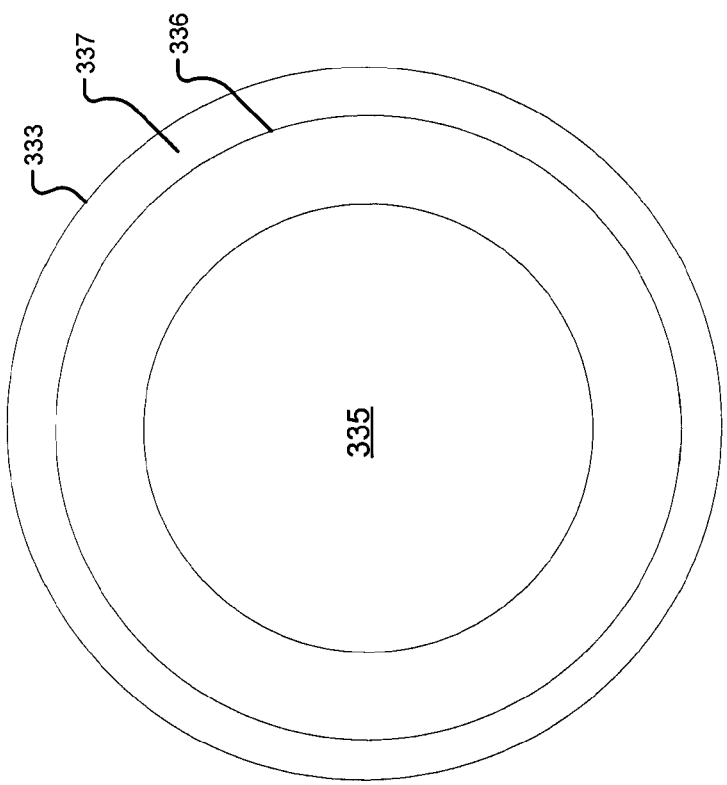
FIG. 4 is a cross-sectional view of a dual-zoned PM filter in accordance with an embodiment of the present disclosure.

In FIGS. 4 and 5, cross-sectional views of a dual-zoned PM filter 333 and a five-zoned PM filter 334 are shown. The PM filter 333 and 334 may be used in replacement of the PF 103 of FIG. 3 and the heater assembly 104 may be zoned accordingly. The dual-zoned PM filter 333 includes an inner circular zone 335, an outer ring-shaped zone 336, and an outer housing 337. The five-zoned PM filter 334 includes an inner circular zone 338, two central hemi-ring-shaped zones 339, four outer quarter-ring-shaped zones 340 and an outer housing 341.

For the dual-zoned PM filter 333, post fuel injection levels associated with the inner circular zone 335 may be higher (e.g. a larger amount of fuel is post injected into the cylinder(s) of the engine or into the exhaust system) than the post fuel injection levels associated with the out ring-shaped zone 336. In one embodiment, when the inner circular zone 335 is electrically heated, post fuel injection is provided to elevate exhaust temperatures to approximately 450° C. When the outer ring-shaped zone 336 is electrically heated, post fuel injection is provided to elevate exhaust temperatures to approximately 550° C.

For the five-zoned PM filter 334, post fuel injection levels may be higher (greater than) for the two central hemi-ring-shaped zones 339 than the inner circular zone 338. Likewise, post fuel injection levels may be higher for the four outer quarter-ring-shaped zones 340 than the two central hemi-ring-shaped zones 339. The two central hemi-ring-shaped zones 339 may not be activated at the same time. Also, the four outer quarter-ring-shaped zones 340 may not be activated at the same time. This reduces the stress forces exerted during a particular period.

Figure 6:
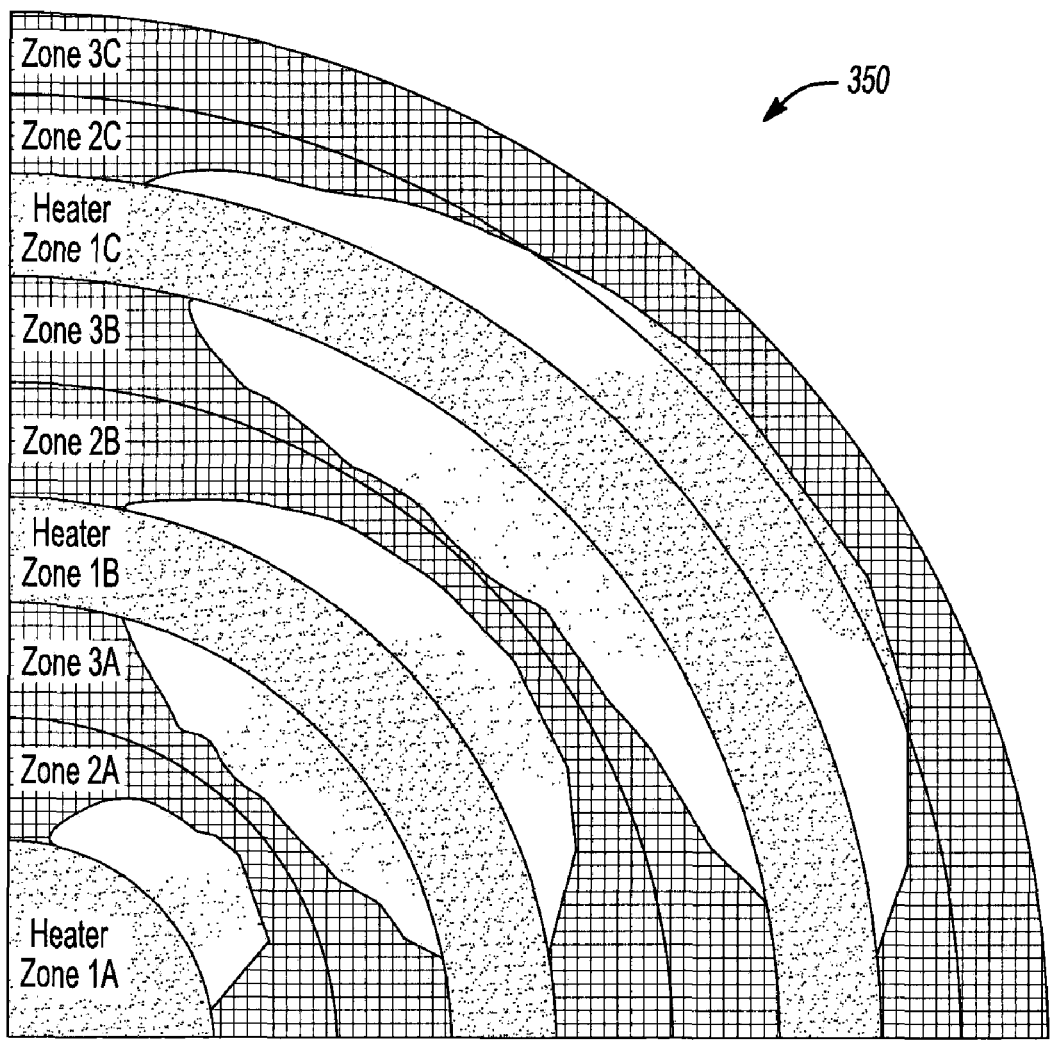
FIG. 6 illustrates exemplary zoning of a zoned inlet heater.

Referring now to FIG. 6, an exemplary zoned inlet heater 350 for the PF assembly 324 is shown. The electrically heated PF assembly 324 is arranged spaced from or in contact with the PF assembly 324. The PF assembly 324 includes multiple spaced heater zones including zone 1 (with sub-zones 1A, 1B and 1C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PF that initially received the heated exhaust gas (e.g. areas downstream from the activated zones) or downstream areas that are ignited by cascading burning soot. The corresponding portions of the PF that are not downstream from an activated zone act as stress mitigation zones. For example, sub-zones 1A, 1B and 1C are activated and sub-zones 2A, 2B, 2C, 3A, 3B, and 3C act as stress mitigation zones.

The corresponding portions of the PF downstream from the active heater sub-zones 1A, 1B and 1C thermally expand and contract during heating and cooling. The stress mitigation sub-zones 2A and 3A, 2B and 3B, and 2C and 3C mitigate stress caused by the expansion and contraction of the heater sub-zones 1A, 1B and 1C. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 7:
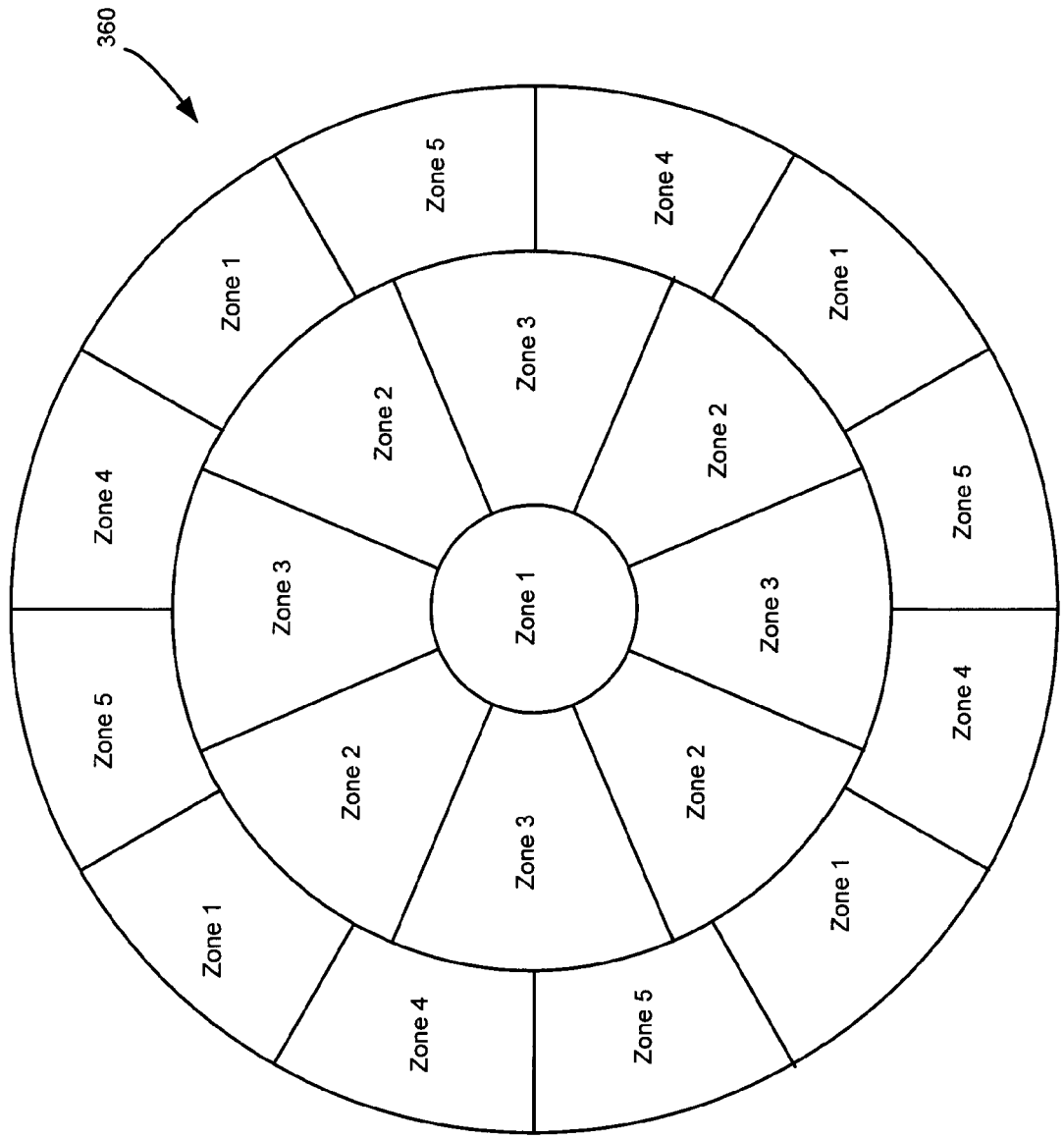
FIG. 7 illustrates exemplary zoning of a zoned inlet heater.

Referring now to FIG. 7, another exemplary zoned inlet heater 360 is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Figure 8:
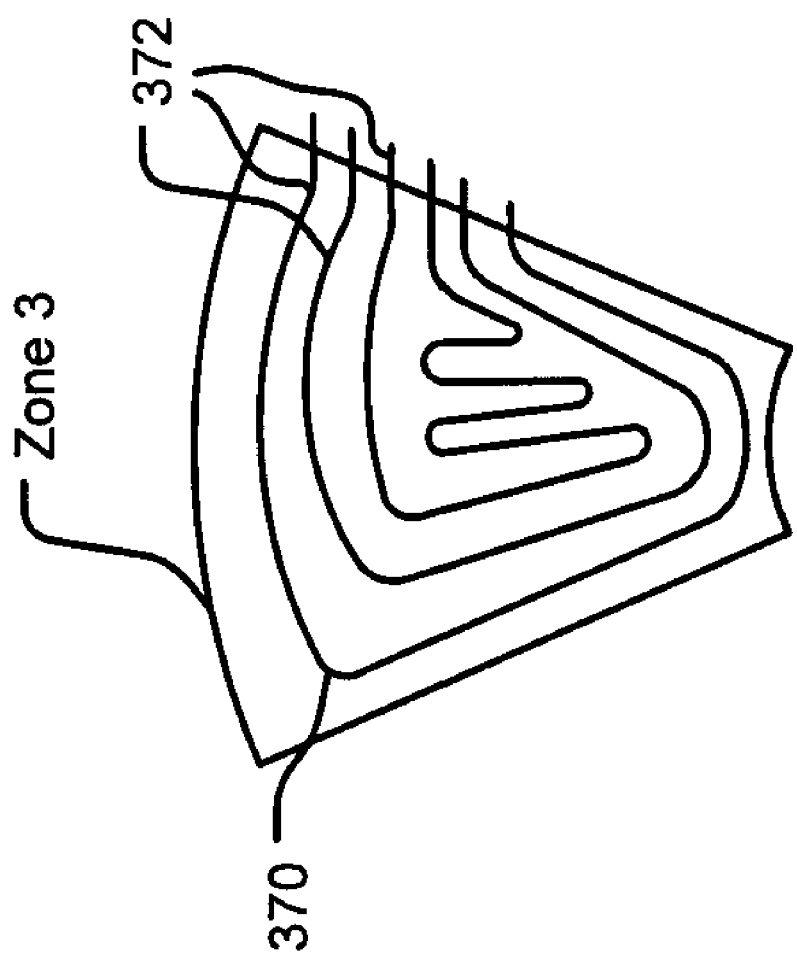
FIG. 8 illustrates an exemplary resistive heater in one of the zones of the zoned inlet heater of FIG. 6.

Referring now to FIG. 8, an exemplary resistive heater 370 arranged adjacent to one of the zones (e.g. zone 3) from the first circumferential band of zones in FIG. 6 is shown. The resistive heater 370 may comprise one or more coils, heater segments, or conductive elements that cover the respective zone to provide sufficient heating. The resistive heater 370, as shown, includes three (3) heater segments 372, which are electrically conductive.

Figure 9:
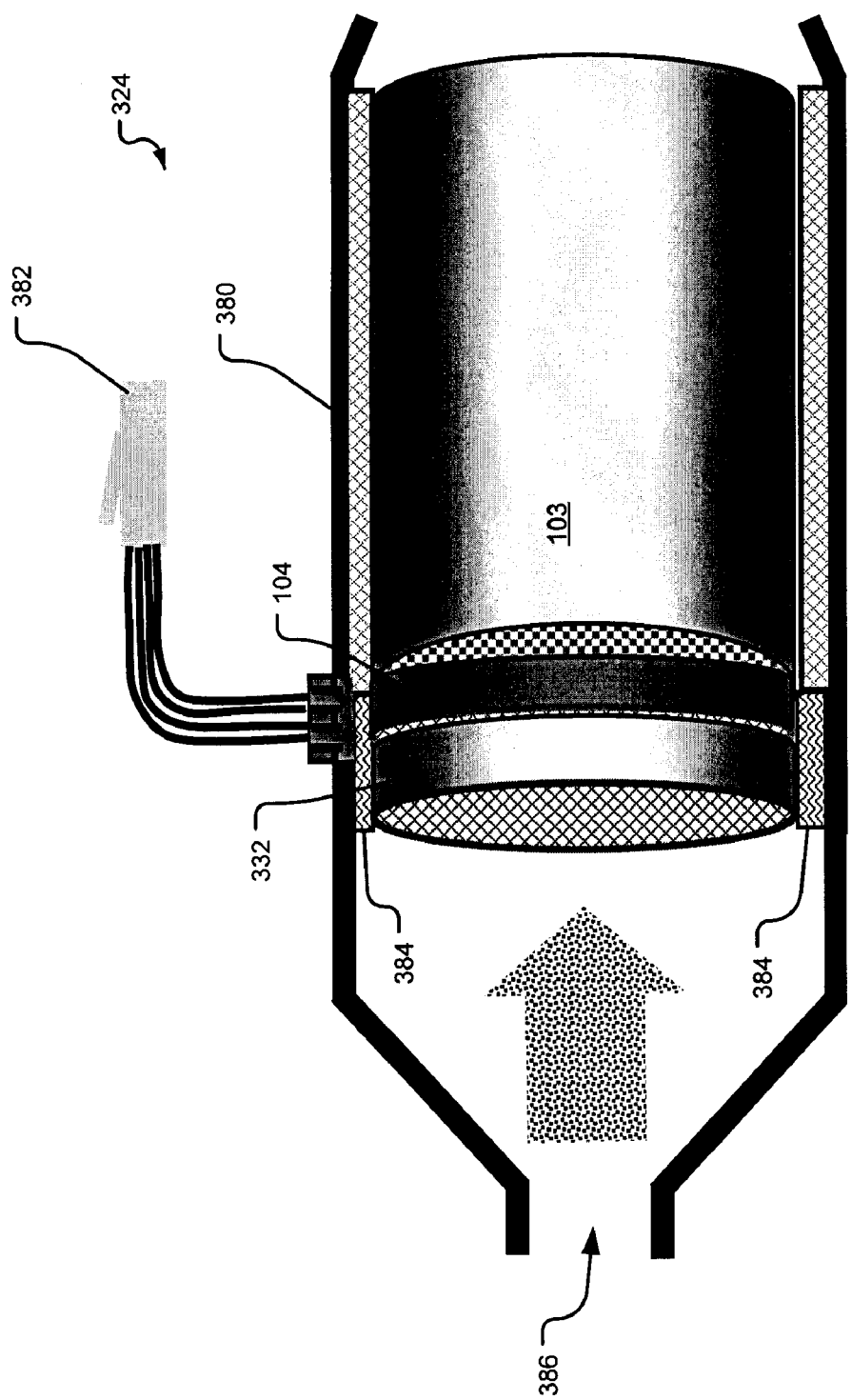
FIG. 9 illustrates the electrically heated PM filter.

Referring now to FIG. 9, the PF assembly 324 is shown in further detail. The PF assembly 324 includes a housing 380, the PF 103, the zoned heater 104, and the second DOC 332. The zoned heater 104 may be arranged between a laminar flow element or the second DOC 332 and a substrate of the PF 103. An electrical connector 382 may provide current to the zones of the PF assembly 324 as described above.

As can be appreciated, the zoned heater 104 may be in contact with or spaced from the PF 103 such that the heating is convection and/or conduction heating. Insulation 384 may be arranged between the zoned heater 104 and the housing 380. Exhaust gas enters the PF assembly 324 from an upstream inlet 386 and is heated by one or more zones of the PF assembly 324. The heated exhaust gas is received by the PF 103.

Figure 10:
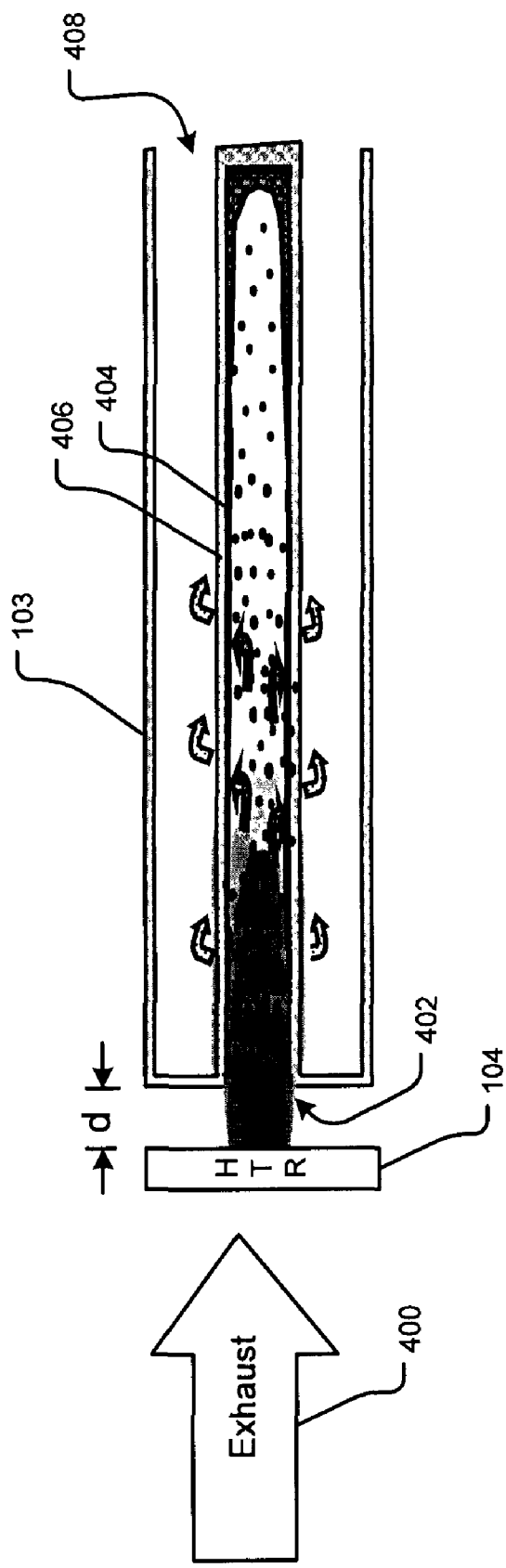
FIG. 10 illustrates heating within a portion of a particulate filter.

Referring now to FIG. 10, heating within the PF assembly 324 is shown in further detail. Exhaust gas 400 passes through the heater 104 and is heated by one or more zones of the heater 104. If spaced from the filter 103, the heated exhaust gas travels a distance "d" and is then received by the filter 103. For example only, the distance "d" may be ½" or less. The filter 103 may have a central inlet 402, a channel 404, filter material 406 and an outlet 408 located radially outside of the inlet. The filter may be catalyzed. The heated exhaust gas causes PM in the filter to burn, which regenerates the PM filter. The heater 104 transfers heat by convection and/or conduction to ignite a front portion of the filter 103. When the soot in the front face portions reaches a sufficiently high temperature, the heater 104 is turned off. Combustion of soot then cascades down a filter channel 404 without requiring power to be maintained to the heater 104.

Figure 11:
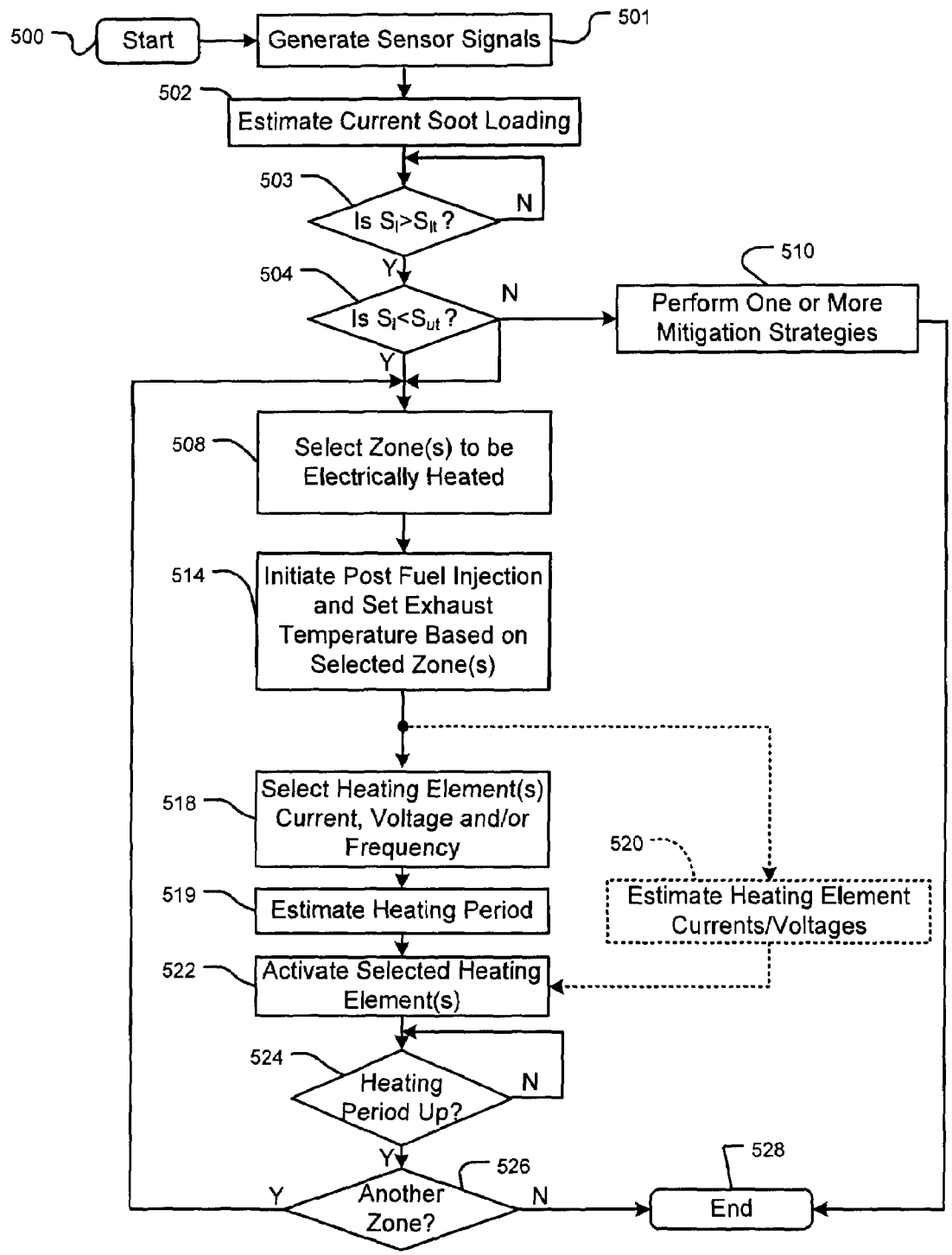
FIG. 11 illustrates a regeneration method for a multi-zoned PM filter in accordance with an embodiment of the present disclosure.

Referring now to FIG. 11, a regeneration method is shown for a multi-zoned PM filter. Although the following steps are primarily described with respect to the embodiments of FIGS. 2-5, the steps may be easily modified to apply to other embodiments of the present disclosure.

In step 500, control of a control module, such as the control module 114 of FIG. 1, begins and proceeds to step 501. In step 501, sensor signals are generated. The sensor signals may include exhaust flow rate signals, exhaust temperature signals, exhaust pressure signals, an oxygen signal, an intake air flow signal, an intake air pressure signal, an intake air temperature signal, an engine speed signal, an EGR signal, etc., which may be generated by the above-described sensors. The sensor information may be updated throughout this method and the regeneration process and may be detected and/or indirectly estimated.

In step 502, control estimates current soot loading $S_l$ of the PF. Control may estimate soot loading as described above. The estimation may be based on the sensor information, vehicle mileage, exhaust pressures, exhaust drop off pressures across the PM filter, and/or a predictive method. The predictive method may include estimation based on one or more engine operating parameters, such as engine load, fueling schemes, fuel injection timing, and EGR. In step 503, control determines whether the current soot loading $S_l$ is greater than a soot loading lower threshold $S_{lt}$. When the current soot loading $S_l$ is greater than the lower threshold $S_{lt}$ control proceeds to step 504, otherwise control returns to step 502.

In step 504, control determines if regeneration is to be performed based on whether current soot loading $S_l$ is less than a soot loading upper threshold $S_{ut}$. When the current soot loading $S_l$ is less than the upper threshold $S_{ut}$ then control proceeds to step 508. When the current soot loading $S_l$ is greater than or equal to the upper threshold $S_{ut}$ then control proceeds to step 510. A soot loading model may be used when determining when to perform regeneration. The soot loading model may be used when performing one or more of steps 502-504. In step 510, control performs mitigation strategies as described above to limit peak temperatures in the PF during regeneration. Step 510 may be performed while performing regeneration steps 508-524.

In step 508, control selects zone(s) to be electrically heated. Any number of zones may be selected. The zones may be selected in any order. In one embodiment, inner most zones are regenerated before outer most zones. In another embodiment outer most zones are regenerated before inner most zones. The inner most zones may be regenerated first to allow additional inward stress absorption when electrically heating the outer most zones. As another example embodiment, when a PM filter has five or more zones, a combination of an inner zone and an outer zone may be regenerated during the same time period. The inner zone may not be adjacent to or located away from the outer zone, such that the inner zone and the outer zone experience minimal forces from each other during regeneration.

In step 514, control initiates post fuel injection and adjusts the temperature of the exhaust. A post fuel injection technique described above may be used to increase the temperature of the exhaust. A post fuel injection level, a predetermined post fuel injection level or an amount of fuel to be injected into the cylinders and/or exhaust system may be determined based on the zone(s) selected in step 508. Higher post fuel injection levels may be provided for selected zone(s) that are closer to a perimeter of the PM filter than for zone(s) that are closer to a longitudinal center of the PM filter. Fuel may be injected directly into the exhaust or into a cylinder of the engine and exhausted from the engine.

In step 518, control selects heating element(s) associated with the selected zone(s). Control may also select current, voltage and/or frequencies of signals to apply to the heating elements. The current, voltage and frequencies may be predetermined and stored in a memory, determined via a look-up table, or determined based on engine operating parameters, some of which are stated herein. The current, voltage and/or frequencies may be based on the sensor information obtained in step 501 and the current soot loading.

In step 519, control estimates a heating period sufficient to achieve a minimum soot temperature. The minimum soot temperature may be based on at least one of current, voltage, exhaust flow, exhaust temperature and predetermined heating element circuit characteristics, such as heating element length, width, coverage area, heating output, etc.

The minimum soot temperature should be sufficient to start the soot burning and to create a cascade effect. For example only, the minimum soot temperature may be set to 700 degrees Celsius or greater. In an alternate step 520 to step 518, control estimates heating element current, voltage and/or frequencies to achieve minimum soot temperatures based on a predetermined heating period, exhaust flows and/or exhaust temperatures.

In step 522, the PF is regenerated by selectively heating one or more of the zones and igniting the soot in the portions of the PF associated with the zones. When soot within the selected zones reaches a regeneration temperature, the selected heating elements may be turned off and the burning soot then cascades down the PF, which is similar to a burning fuse on a firework. In other words, the heating elements may be activated long enough to start the soot ignition and may then be deactivated or may be activated throughout the soot burning process.

In one embodiment, radially outer most zones are regenerated first followed by radially inner zones. The zones may be regenerated in a select, predetermined, sequential, independent, or arbitrary manner. Multiple zones may be selected and heated during the same time period.

In step 524, control determines whether the heating period is up. If step 524 is true, control determines whether additional zones need to be regenerated in step 526. If step 526 is true, control returns to step 508.

The burning soot is the fuel that continues the regeneration. This process is continued for each heating zone until the PF is completely regenerated. Control ends in step 528.

The above-described steps are meant to be illustrative examples; the steps may be performed sequentially, synchronously, simultaneously, continuously, during overlapping time periods or in a different order depending upon the application.

In use, the control module determines when the PF requires regeneration. The determination is based on soot levels within the PF. Alternately, regeneration can be performed periodically or on an event basis. The control module may estimate when the entire PF needs regeneration or when zones within the PF need regeneration. When the control module determines that the entire PF needs regeneration, the control module sequentially activates one or more of the zones at a time to initiate regeneration within the associated downstream portion of the PF. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

Figure 12:
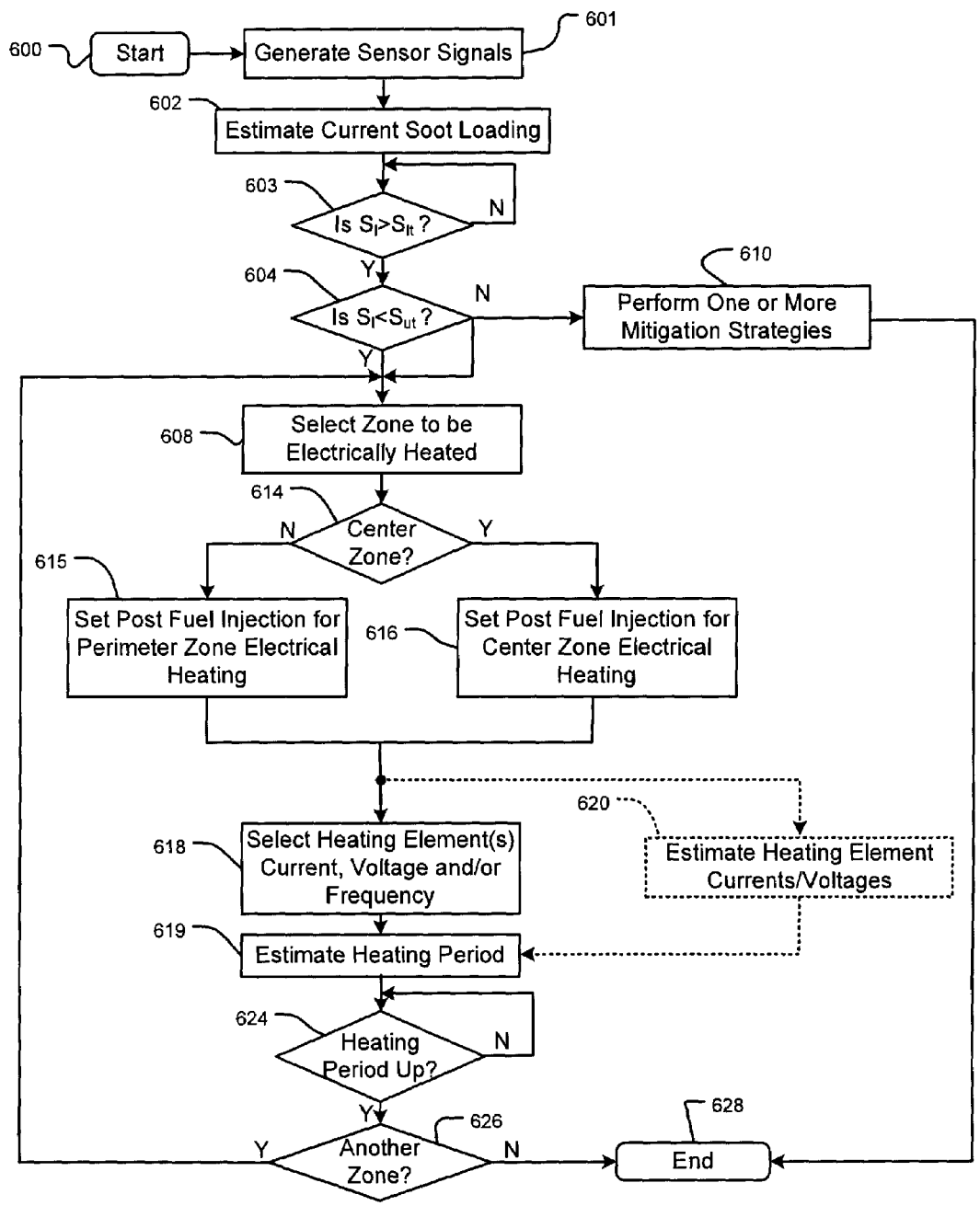
FIG. 12 illustrates a regeneration method for a dual-zoned PM filter in accordance with an embodiment of the present disclosure.

Referring now to FIG. 12, another regeneration method is shown for a dual-zoned PM filter. Although the following steps are primarily described with respect to the embodiments of FIGS. 2-4, the steps may be easily modified to apply to other embodiments of the present disclosure.

Steps 600-604 are similar to steps 500-504. In step 600, control of a control module, such as the control module 114 of FIG. 1, begins and proceeds to step 601. In step 601, sensor signals are generated. In step 602, control estimates current soot loading $S_l$ of the PF. In step 603, control determines whether the current soot loading $S_l$ is greater than a soot loading lower threshold $S_{lt}$. When the current soot loading $S_l$ is greater than the lower threshold $S_{lt}$ control proceeds to step 504, otherwise control returns to step 602.

In step 604, control determines if regeneration is to be performed based on whether current soot loading $S_l$ is less than a soot loading upper threshold $S_{ut}$. When the current soot loading $S_l$ is less than the upper threshold $S_{ut}$ then control proceeds to step 608. When the current soot loading $S_l$ is greater than or equal to the upper threshold $S_{ut}$ then control proceeds to step 610. A soot loading model may be used when determining when to perform regeneration. The soot loading model may be used when performing one or more of steps 602-604. In step 610, control performs mitigation strategies as described above to limit peak temperatures in the PF during regeneration. Step 510 may be performed while performing regeneration steps 608-624.

In step 608, control selects one of the zones to be electrically heated. The inner circular (center) zone or the outer ring-shaped (perimeter) zone may be selected. In step 614, when the outer ring-shaped zone is selected, step 615 is performed, otherwise step 616 is performed.

In step 615 and 616, control initiates post fuel injection and adjusts the temperature of the exhaust. A post fuel injection technique described above may be used to increase the temperature of the exhaust. A post fuel injection level, a predetermined post fuel injection level or an amount of fuel to be injected into the cylinders and/or exhaust system may be determined based on the selected zone. In step 615, a higher post fuel injection level may be provided than in step 616, as the outer ring-shaped zone is closer to the perimeter of the PM filter than the inner circular zone.

In step 618, control selects heating element(s) associated with the selected zone. Control may also select current, voltage and/or frequencies of signals to apply to the heating elements. The current, voltage and frequencies may be predetermined and stored in a memory, determined via a look-up table, or determined based on engine operating parameters, some of which are stated herein. The current, voltage and/or frequencies may be based on the sensor information obtained in step 601 and the current soot loading.

In step 619, control estimates a heating period sufficient to achieve a minimum soot temperature. The minimum soot temperature may be based on at least one of current, voltage, exhaust flow, exhaust temperature and predetermined heating element circuit characteristics, such as heating element length, width, coverage area, heating output, etc.

The minimum soot temperature should be sufficient to start the soot burning and to create a cascade effect. For example only, the minimum soot temperature may be set to 700 degrees Celsius or greater. In an alternate step 620 to step 618, control estimates heating element current, voltage and/or frequencies to achieve minimum soot temperatures based on a predetermined heating period, exhaust flows and/or exhaust temperatures.

In step 622, the PF is regenerated by selectively heating one or more of the zones and igniting the soot in the portions of the PF associated with the zones. When soot within the selected zones reaches a regeneration temperature, the selected heating elements may be turned off and the burning soot then cascades down the PF, which is similar to a burning fuse on a firework. In other words, the heating elements may be activated long enough to start the soot ignition and may then be deactivated or may be activated throughout the soot burning process.

In one embodiment, radially outer most zones are regenerated first followed by radially inner zones. The zones may be regenerated in a select, predetermined, sequential, independent, or arbitrary manner. Multiple zones may be selected and heated during the same time period.

In step 624, control determines whether the heating period is up. If step 624 is true, control determines whether additional zones need to be regenerated in step 626. If step 626 is true, control returns to step 608.

The burning soot is the fuel that continues the regeneration. This process is continued for each heating zone until the PF is completely regenerated. Control ends in step 628.

The above-described steps are meant to be illustrative examples; the steps may be performed sequentially, synchronously, simultaneously, continuously, during overlapping time periods or in a different order depending upon the application.

The above-described embodiments provide control strategies for fuel efficient PF regeneration with enhanced filter durability. The adjustment in post fuel injection based on electrically heated zone activation efficiently cleans a PF with the least amount of fuel. This maximizes the operating life of an electrically heated PF.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a particulate matter (PM) filter that includes a plurality of zones;
   an electrical heater that includes a plurality of heater segments that are associated with respective ones of the plurality of zones,
   wherein the electrical heater is arranged upstream from and proximate with the PM filter;
   a post fuel injection system that injects fuel into at least one of a cylinder of an engine and an exhaust system; and
   a control module that selects one of the plurality of zones, adjusts post fuel injection based on the selected one of the plurality of zones, and electrically heats the one of the plurality of zones via a respective one of the plurality of heater segments.

2. The system of claim 1, wherein the control module sets a first post fuel injection level when activating a first heater segment associated with a first one of the plurality of zones and a second post fuel injection level when activating a second heater segment associated with a second one of the plurality of zones.

3. The system of claim 2, wherein the first post fuel injection level is associated with injecting more post injected fuel than the second post fuel injection level.

4. The system of claim 2, wherein the first one of the plurality of zones is closer to a perimeter of the PM filter than a second one of the plurality of zones, and
   wherein the first one of the plurality of zones is activated when the second one of the plurality of zones is not activated.

5. The system of claim 2, wherein the first one of the plurality of zones is ring-shaped and the second one of the plurality of zones is circular shaped.

6. The system of claim 2, wherein the first one of the plurality of zones at least partially surrounds the second one of the plurality of zones.

7. The system of claim 1, wherein the control module increases temperature of an exhaust gas to a first predetermined level via the post fuel injection system when electrically heating a first one of the plurality of zones,
   wherein the control module increases temperature of an exhaust gas to a second predetermined level via the post fuel injection system when electrically heating a second one of the plurality of zones, and
   wherein the first predetermined level is greater than the second predetermined level.

8. The system of claim 7, wherein the first one of the plurality of zones is closer to a perimeter of the PM filter than the second one of the plurality of zones.

9. The system of claim 1, wherein the control module electrically heats ones of the plurality of zones that are at different distances from a center of the PM filter during the same time period.

10. The system of claim 1, wherein the control module selectively activates the electrical heater and providing post injected fuel via the post fuel injection system based on soot loading of the PM filter.

11. A method comprising:
providing a particulate matter (PM) filter that includes a plurality of zones;
arranging an electrical heater, that includes a plurality of heater segments that are associated with respective ones of the plurality of zones, upstream from and proximate with the PM filter;
injecting fuel into at least one of a cylinder of an engine and an exhaust system via a post fuel injection system;
selecting one of the plurality of zones for regeneration;
adjusting post fuel injection based on the selected one of the plurality of zones; and
electrically heating the one of the plurality of zones via a respective one of the plurality of heater segments.

12. The method of claim 11 further comprising:
setting a first post fuel injection level when activating a first heater segment associated with a first one of the plurality of zones; and
setting a second post fuel injection level when activating a second heater segment associated with a second one of the plurality of zones.

13. The method of claim 12, wherein the first post fuel injection level is associated with injecting more post injected fuel than the second post fuel injection level.

14. The method of claim 12, wherein the first one of the plurality of zones is closer to a perimeter of the PM filter than a second one of the plurality of zones, and wherein the first one of the plurality of zones is activated when the second one of the plurality of zones is not activated.

15. The method of claim 12, wherein the first one of the plurality of zones is ring-shaped and the second one of the plurality of zones is circular shaped.

16. The method of claim 12, wherein the first one of the plurality of zones at least partially surrounds the second one of the plurality of zones.

17. The method of claim 11 further comprising:
increasing temperature of an exhaust gas to a first predetermined level via the post fuel injection system when electrically heating a first one of the plurality of zones; and
increasing temperature of an exhaust gas to a second predetermined level via the post fuel injection system when electrically heating a second one of the plurality of zones,
wherein the first predetermined level is greater than the second predetermined level.

18. The method of claim 17, wherein the first one of the plurality of zones is closer to a perimeter of the PM filter than the second one of the plurality of zones.

19. The method of claim 11 comprising electrically heating N of the plurality of zones that are at different distances from a center of the PM filter during the same time period, where N is an integer greater than 1.

20. The method of claim 11 comprising selectively activating ones of the plurality of heater segments and providing post injected fuel via the post fuel injection system based on soot loading of the PM filter.

* * * * *